US010992997B2

(12) United States Patent
Kreiner et al.

(10) Patent No.: US 10,992,997 B2
(45) Date of Patent: Apr. 27, 2021

(54) VIDEO ALTERNATE NETWORK ACCESS POINTS AND RECEIVERS

(71) Applicant: AT&T Intellectual Property I, L.P., Atlanta, GA (US)

(72) Inventors: Barrett Kreiner, Woodstock, GA (US); Ryan Schaub, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 25 days.

(21) Appl. No.: 15/852,763

(22) Filed: Dec. 22, 2017

(65) Prior Publication Data
US 2019/0200092 A1 Jun. 27, 2019

(51) Int. Cl.
| | |
|---|---|
| H04N 21/6405 | (2011.01) |
| H04N 21/45 | (2011.01) |
| H04N 21/61 | (2011.01) |
| H04H 40/00 | (2009.01) |
| H04N 7/20 | (2006.01) |
| H04H 20/63 | (2008.01) |
| H04H 40/90 | (2008.01) |

(52) U.S. Cl.
CPC ........ *H04N 21/6405* (2013.01); *H04H 40/00* (2013.01); *H04N 7/20* (2013.01); *H04N 21/4524* (2013.01); *H04N 21/6193* (2013.01); *H04H 20/63* (2013.01); *H04H 40/90* (2013.01)

(58) Field of Classification Search
CPC .. H04N 21/6405; H04N 7/20; H04N 21/4524; H04N 21/6193; H04H 40/00; H04H 20/63; H04H 40/90
See application file for complete search history.

(56) References Cited

U.S. PATENT DOCUMENTS

| | | | | |
|---|---|---|---|---|
| 5,432,501 | A | * | 7/1995 | Yoon .................... G08B 21/185 323/906 |
| 9,131,254 | B2 | | 9/2015 | Jiang et al. |
| 9,166,808 | B2 | | 10/2015 | Gou et al. |
| 9,554,195 | B2 | | 1/2017 | Baldwin |
| 2006/0053436 | A1 | * | 3/2006 | Allwein ............. H04N 7/17309 725/1 |
| 2009/0167465 | A1 | * | 7/2009 | Martch .................. H04H 20/63 333/24 R |
| 2012/0137320 | A1 | * | 5/2012 | Mugulavalli ........ H04N 21/222 725/25 |

(Continued)

*Primary Examiner* — Michael R Telan
(74) *Attorney, Agent, or Firm* — Hartman & Citrin LLC

(57) ABSTRACT

Concepts and technologies for video alternate network access points and receivers that enable wireless delivery of video content to multiple customer premises over a service area are provided herein. In an embodiment, a system includes a satellite dish receiver that is configured to receive a satellite video feed, and a video alternate network access point that is communicatively coupled to the satellite dish receiver. The video alternate network access point can perform operations that ingest the satellite video feed directly from the satellite dish receiver. The operations can activate a microcell transceiver embedded within the video alternate network access point, and identify a multicast-broadcast single-frequency network channel. The operations can then transmit, to a video alternate network receiver device from the microcell transceiver, the satellite video feed over at least the multicast-broadcast single-frequency network channel.

20 Claims, 5 Drawing Sheets

(56) References Cited

U.S. PATENT DOCUMENTS

| | | | |
|---|---|---|---|
| 2012/0195427 A1* | 8/2012 | Cousins | H04W 4/001 380/247 |
| 2013/0104173 A1* | 4/2013 | Tjio | H04N 21/2187 725/62 |
| 2014/0089991 A1* | 3/2014 | Wang | H04N 21/6143 725/68 |
| 2014/0165110 A1* | 6/2014 | Sibley | H04N 7/088 725/62 |
| 2015/0055541 A1* | 2/2015 | Zhang | H04W 72/005 370/312 |
| 2015/0089016 A1* | 3/2015 | Jellison, Jr. | H04L 65/60 709/217 |
| 2015/0327299 A1 | 11/2015 | Koskinen | |
| 2015/0350284 A1 | 12/2015 | Wei et al. | |
| 2015/0382037 A1 | 12/2015 | Huang et al. | |

\* cited by examiner

VIDEO ALTERNATE NETWORK ACCESS POINTS AND RECEIVERS

BACKGROUND

Conventional cable and satellite delivery of video content requires each customer premises to have one or more satellite dishes mounted outside and pointed to a satellite. Conventional satellite systems may receive Ka-band satellite feed and/or Ku-band satellite feed across two signal polarizations. However, the conventional satellite systems cannot carry the entire satellite feed across a single coaxial cable. Therefore, conventional satellite systems send one of four sub-bands (in one of vertical or horizontal polarization, and high or low frequencies) from the satellite dish to an indoor set-top box receiver using a coaxial cable that physically extends through walls and through other physical structures of a customer premises. When the conventional set-top box receiver seeks a different sub-band, the conventional set-top box receiver must use the coaxial cable to signal the satellite dish using a defined voltage and/or frequency tone. Although satellite service providers have typically subsidized installation costs, the conventional satellite systems can, and typically do, lead to high installation costs due to the extended runs of cable, piercing walls, and mounting of the conventional satellite dish to each customer premise. Some conventional satellite systems may require installation of multiple coaxial cables that supply multiple conventional set-top box receivers when the customer premise has multiple viewing devices.

Previous attempts to provide video content over wired internet protocol have faced similar physical limitations due to network topology, such as requiring coaxial and/or twisted pair wiring through walls in order to reach a conventional receiver at the customer premise. Additionally, conventional techniques to use Wi-Fi transport to deliver video content have incurred reception and interference issues, along with requiring the Wi-Fi base station to be within close proximity to the consuming devices, such as requiring the conventional Wi-Fi base station to be within the customer premises or a maximum of a few hundred feet away. Moreover, previous attempts to use Wi-Fi to broadcast video content have continued to require each customer premises to have one or more satellite dish with physical wiring going into each customer premises.

SUMMARY

The present disclosure is directed to video alternate network access points and receivers that enable wireless delivery of video content to multiple customer premises. According to one aspect of the concepts and technologies disclosed herein, a system is disclosed. The system can include a satellite dish receiver that is configured to receive a satellite video feed. The system also can include a video alternate network access point that is communicatively coupled to the satellite dish receiver. In some embodiments, the video alternate network access point can electrically power the satellite dish receiver. In some embodiments, the satellite dish receiver can communicatively couple directly to the video alternate network access point via at least one of a low-noise block converter, an optical low-noise block converter, or a combination thereof. In some embodiments, the video alternate network access point is one of a plurality of video alternate network access points that form a multicast-broadcast single-frequency network. In some embodiments, the video alternate network access point can include a microcell transceiver embedded within the video alternate network access point. The video alternate network access point can also include a processor and a memory. The memory can store computer-executable instructions that, when executed by the processor, cause the processor to perform operations. The operations can include ingesting the satellite video feed directly from the satellite dish receiver. The operations also can include activating the microcell transceiver embedded within the video alternate network access point. The operations can further include identifying a multicast-broadcast single-frequency network channel. The operations can include transmitting, to a video alternate network receiver device from the microcell transceiver, the satellite video feed over at least the multicast-broadcast single-frequency network channel. In some embodiments, the microcell transceiver can include a long term evolution radio transmitter that transmits the satellite video feed over the multicast-broadcast single-frequency network channel in an unlicensed spectrum.

In some embodiments, the operations further can include synchronizing the transmission of the satellite video feed over the multicast-broadcast single-frequency network channel with at least one of the plurality of video alternate network access points within the multicast-broadcast single-frequency network. In some embodiments, the operations can further include receiving, from the video alternate network receiver device, a video alternate network receiver identifier. The operations can include determining a current geolocation of the video alternate network receiver device, and determining that the video alternate network receiver device originates from a prohibited geolocation area that is prohibited from presenting a portion of video content from the satellite video feed. The operations also can include instructing a content provisioning system to prevent the video alternate network receiver device from presenting the portion of video content from the satellite video feed that is transmitted over the multicast-broadcast single-frequency network channel.

According to another aspect of the concepts and technologies disclosed herein, a method is disclosed. The method can include ingesting, by a video alternate network access point, a satellite video feed directly from the satellite dish receiver. In some embodiments, the video alternate network access point can electrically power the satellite dish receiver. In some embodiments, the satellite dish receiver communicatively couples directly to the video alternate network access point via at least one of a low-noise block converter, an optical low-noise block converter, or a combination thereof. In some embodiments, the video alternate network access point is one of a plurality of video alternate network access points that form a multicast-broadcast single-frequency network. The method can further include activating, by the video alternate network access point, a microcell transceiver embedded within the video alternate network access point. The method also can include identifying, by the video alternate network access point, a multicast-broadcast single-frequency network channel. The method can further include transmitting, to a video alternate network receiver device from the microcell transceiver, the satellite video feed over at least the multicast-broadcast single-frequency network channel. In some embodiments, the method includes synchronizing the transmission of the satellite video feed over the multicast-broadcast single-frequency network channel with at least one of the plurality of video alternate network access points within the multicast-broadcast single-frequency network. In some embodiments, the microcell transceiver includes a long term evolution radio transmitter that transmits the satellite video feed over the multicast-broadcast single-frequency network channel in an unlicensed spectrum.

In some embodiments, the method also can include receiving, from the video alternate network receiver, a video alternate network receiver identifier. The method can include determining, by the video alternate network access point, a current geolocation of the video alternate network receiver device. The method also can include determining that the video alternate network receiver device originates from a prohibited geolocation area that is prohibited from presenting a portion of video content from the satellite video feed. The method also can include instructing, by the video alternate network access point, a content provisioning system to prevent the video alternate network receiver device from presenting the portion of video content from the satellite video feed that is transmitted over the multicast-broadcast single-frequency network channel.

According to yet another aspect, a computer storage medium is disclosed. The computer storage medium can have computer-executable instructions stored thereon. In some embodiments, the computer storage medium can be included within a video alternate network access point. When the computer-executable instructions are executed by a processor, the processor can perform operations. The operations can include ingesting a satellite video feed directly from a satellite dish receiver. In some embodiments, the satellite dish receiver can communicatively couple directly to the video alternate network access point via at least one of a low-noise block converter, an optical low-noise block converter, or a combination thereof. In some embodiments, the video alternate network access point can electrically power the satellite dish receiver. The operations also can include activating a microcell transceiver embedded within the video alternate network access point. In some embodiments, the microcell transceiver includes a long term evolution radio transmitter that transmits the satellite video feed over the multicast-broadcast single-frequency network channel in an unlicensed spectrum. In some embodiments, the video alternate network access point is one of a plurality of video alternate network access points that form a multicast-broadcast single-frequency network.

The operations also can include identifying a multicast-broadcast single-frequency network channel. The operations can include transmitting, to a video alternate network receiver device from the microcell transceiver, the satellite video feed over at least the multicast-broadcast single-frequency network channel. In some embodiments, the operations can include synchronizing the transmission of the satellite video feed over the multicast-broadcast single-frequency network channel with at least one of the plurality of video alternate network access points within the multicast-broadcast single-frequency network. In some embodiments, the operations can also include receiving a video alternate network receiver identifier from the video alternate network receiver. The operations can include determining a current geolocation of the video alternate network receiver. In some embodiments, the operations can include determining that the video alternate network receiver device originates from a prohibited geolocation area that is prohibited from presenting a portion of video content from the satellite video feed. The operations can further include instructing a content provisioning system to prevent the video alternate network receiver device from presenting the portion of video content from the satellite video feed that is transmitted over the multicast-broadcast single-frequency network channel.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
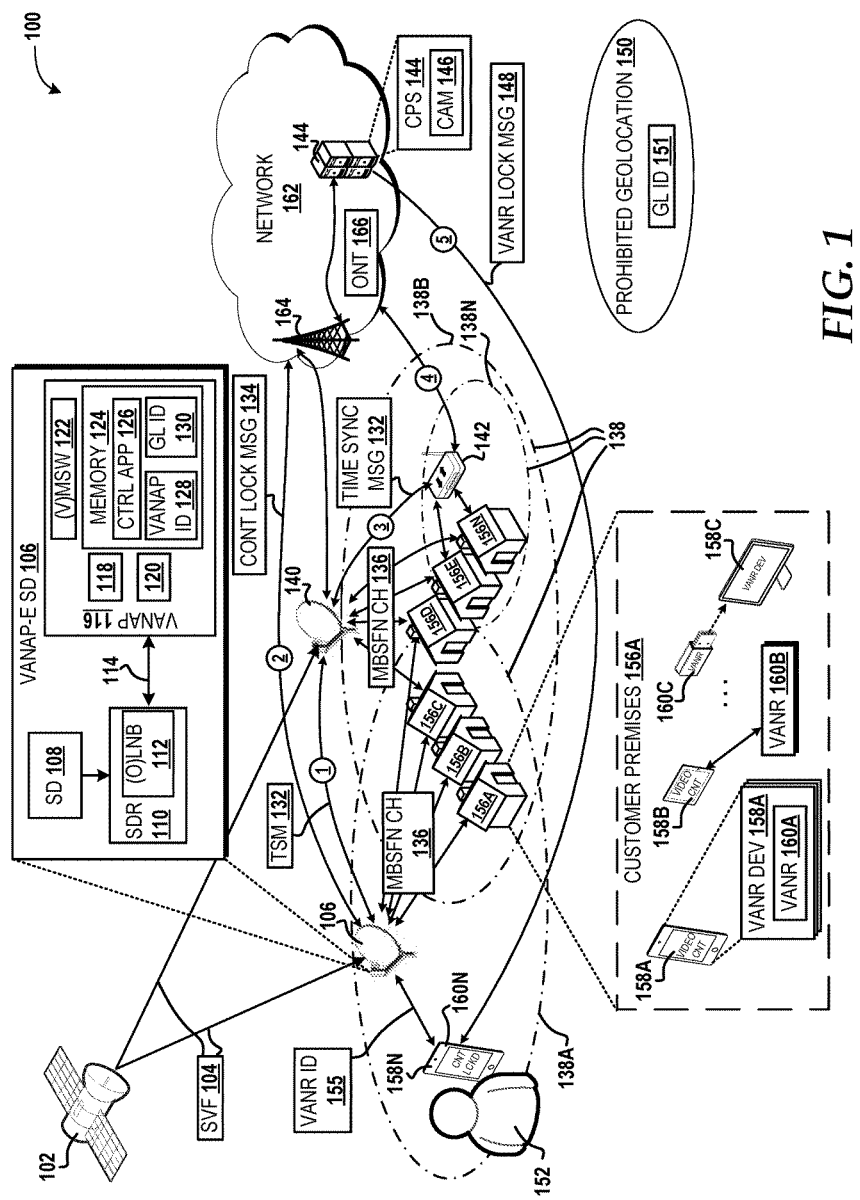
FIG. 1 is a system diagram illustrating a system that includes video alternate network access points and receivers that enable wireless delivery of video content to multiple customer premises for various embodiments of the concepts and technologies described herein.

The following detailed description is directed to video alternate network access points and receivers that enable video content from a satellite feed to be wirelessly delivered to multiple customer premises. Concepts and technologies discussed herein include a video alternate network access point (VANAP)-enabled satellite dish system in which a satellite video feed can be collected from an extraterrestrial source, such as a satellite. In some embodiments, a satellite feed can be transmitted using a Ku-band spectrum and/or a Ka-band spectrum. In various embodiments, a Ku-band spectrum can include four sub-bands that have a collective span of 11.70-12.75 GHz across two signal polarizations. In various embodiments, a Ka-band spectrum can include at least three sub-bands that have a collective span of 18.2-22.2 GHz across two signal polarizations. Embodiments of the present disclosure can collect the satellite video feed using a satellite dish receiver. The satellite dish receiver can include a low-noise block converter (LNB) that can convert the received satellite video feed for transmission to a communicatively coupled VANAP. In some embodiments, the LNB can be electrically powered by the VANAP. Various embodiments can configure the LNB as an optical LNB such that the optical LNB can down-convert an entire band spectrum of the satellite video feed to multiple sub-band intermediate frequencies, which the optical LNB can then stack so as to create a single intermediate frequency range.

For example, in an embodiment in which the satellite video feed is sent from the satellite using the Ku-band, the optical LNB can collect the entire Ku-band spectrum across two polarizations and simultaneously down-convert the spectrum into four-sub-bands. The optical LNB can create a single intermediate frequency range having 4.5 GHz bandwidth by stacking the four sub-bands with intermediate frequencies ranging from 0.95-5.45 GHz. In some embodiments, the LNB of the satellite dish receiver can use a semiconductor laser to modulate an optical signal along a coupling path (e.g., a communicative coupling path that includes a fiber optic cable) to the VANAP. In some embodiments, the VANAP can be attached to a portion of the VANAP-enabled satellite system. In other embodiments, the VANAP can be communicatively coupled directly to the satellite dish receiver without residing within a customer's premises. The VANAP can be configured to receive the satellite video feed over the coupling path, activate a microcell transceiver, and identify the communication link that will be used to wirelessly transmit video content of the satellite video feed to multiple customer premises, such as to a video alternate network receiver (VANR) device discussed below. The VANAP-enabled satellite system can reduce or otherwise eliminate the conventional requirement that each customer premises has a satellite dish and physical wiring (or equipment) entering the customer's premises and/or located on the customer's property.

Various deployment scenarios can allow for a single VANAP-enabled satellite system to serve at least multiple residences, and even an entire neighborhood, city, and/or town. In various embodiments of the present disclosure, the VANAP can wirelessly transmit the satellite video feed over an unlicensed spectrum of one or more frequency bands. A VANAP's use of unlicensed spectrum can be configured to be used with a long term evolution (LTE) protocol by the third generation partnership project (3GPP). A VANAP can include an LTE radio transmitter that is configured to use an LTE protocol in both a licensed spectrum and an unlicensed spectrum. Use of the LTE protocol in an unlicensed spectrum can be referred to herein as LTE in unlicensed spectrum (LTE-U). In various embodiments, a VANAP can implement a carrier aggregation mode to transmit and convey a LTE-U downlink transmission from a licensed spectrum (e.g., the satellite video feed from the Ka-band and/or Ku-band) to an unlicensed spectrum. In various embodiments, the LTE-U downlink and uplink communications can occur between the VANAP and one or more VANR devices. In some embodiments, the VANAP can perform a clear channel assessment to determine a particular channel that should be used within the LTE-U spectrum. In some embodiments, the determination of a particular channel is dependent, at least in part, on channel characteristics of the spectrum under consideration, such as but not limited to, path loss, frequency selectivity, signal-to-noise ratio, or other aspects that can vary based on the carrier frequency being considered. In some instances, the VANAP can communicate with an access point of a network, such as an evolved Node B (eNodeB), and may relay uplink communications from one or more VANR devices to the access point of the network. In some embodiments, transmissions between the VANAP and a VANR occur within an unlicensed spectrum (e.g., LTE-U), and the VANAP can simultaneously engage a licensed spectrum (e.g., LTE) to communicate with an access point of a network.

In various embodiments, a system can include multiple VANAP-enabled satellite dish systems that include one or more VANAPs. In some embodiments, each VANAP can transmit video content of the satellite video feed using Orthogonal Frequency-Division Multiple Access (OFDMA). In some embodiments, a plurality of VANAPs can form a multicast-broadcast single-frequency network (MBSFN) such that each VANAP provides the satellite video feed in synchronization with each other by the use of the same carrier channel, referred to herein as a MBSFN channel. The use of "SFN" (single frequency network) of the term "MBSFN" refers to a VANAP using the same radio frequency band (e.g., corresponding to LTE-U), where the MBSFN channel may be an aggregated component carrier channel via the use of carrier aggregation. For example, each VANAP-enabled satellite dish can identify a MBSFN channel being used by other VANAPs within the service area. In some embodiments, the MBSFN channel being used corresponds with an LTE protocol in unlicensed spectrum (e.g., LTE-U). The VANAP can activate a radio transmitter so as to transmit the satellite video feed over the MBSFN channel in sufficiently synchronized transmissions with other VANAPs so that the satellite video feed arrives at a VANR within an OFDMA cyclic prefix (CP), thereby avoiding inter-symbol interference. This can allow each VANR device to receive video content from the satellite video feed through transmissions from multiple VANAPs. In some embodiments, the OFDMA CP can correspond with a redundant portion of data that is added by a VANAP to the satellite video feed at a time of transmission to a VANR in order to prevent a data overlap at the VANR.

In some embodiments, the satellite video feed may include video content that is geolocked (e.g., video content associated with professional sports like football, basketball, and/or baseball) such that video content is temporarily prohibited from being broadcast in certain geographic areas in order to promote game attendance by customers in those geographic areas. For example, if a professional football team is playing in the football team's hometown, then communication service providers may be prohibited from broadcasting video content that displays a football game in the football team's hometown in order to promote game attendance. However, some embodiments of a VANR device can include a user equipment (e.g., a mobile communication device with a VANR embedded therein) that is mobile in nature, and thus can be carried outside of the service area that is prohibited from broadcasting the event (e.g., the football game). Thus, in some embodiments where the VANR device is mobile, the VANR device may provide a VANR identification (ID) to a VANAP, and in turn, the VANAP may determine whether the satellite video feed being broadcast corresponds with video content currently under prohibition from being presented in certain prohibited geographical areas. If so, the VANAP can determine whether the VANR device originates from a prohibited geographical area based on the VANR ID. If the VANR device originates from a prohibited geographical area that is prohibited from presenting at least a portion of video content from the satellite video feed, then the VANAP can instruct a content provisioning system to prevent the VANR device from presenting at least the portion of video content based on the VANR device. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of a system 100 for implementing various embodiments of the concepts and technologies disclosed herein for enabling wireless delivery of video content will be described, according to an illustrative embodiment. The system 100 shown in FIG. 1 includes a satellite 102, a satellite video feed 104, a VANAP-enabled satellite dish system 106, a second VANAP-enabled satellite dish system 140, a standalone VANAP 142, a content provisioning system (CPS) 144, a prohibited geolocation area 150, a user 152, a plurality of customer premises 156A-N, a plurality of VANR devices 158A-N, a communications network ("network") 162, an access point 164, and an optical network terminal 166. The system 100 also can include a communication path 1, a communication path 2, a communication path 3, a communication path 4, and a communication path 5.

The satellite 102 can be considered an extraterrestrial source by which video content can be transmitted, such as via the satellite video feed 104. In some embodiments, the satellite video feed 104 can be transmitted using a Ku-band and/or a Ka-band of frequencies. Although a single satellite 102 is illustrated, it is understood that more than one satellite 102 may supply the satellite video feed 104 to the system 100. In some embodiments, the satellite video feed 104 may be provided by a remote operated vehicle or other flying apparatus that may project a video feed to objects at a lower altitude than the source. In some embodiments, the VANAP-enabled satellite dish system 106 can include a satellite dish 108, a satellite dish receiver 110, a low-noise block converter (LNB) 112, and a VANAP 116. The satellite dish 108 can include a parabolic antenna that can be configured to receive and focus the satellite video feed 104 to the LNB 112. The LNB 112 can be positioned so as to collect the satellite video feed 104 reflected off the satellite dish 108. In some embodiments, the LNB 112 can include a plurality of LNB downconverters. In some embodiments, the LNB 112 can include a linearly polarized LNB. In some embodiments, the LNB 112 can be configured to include an optical and/or virtual LNB, and thus be referred to as an optical LNB (OLNB). When the LNB 112 includes an OLNB, the OLNB can down-convert an entire band spectrum of the satellite video feed 104 to multiple sub-band intermediate frequencies, which the OLNB can then stack so as to create a single intermediate frequency range. For example, the LNB 112 can be configured to carry the complete Ku-band spectrum corresponding to the satellite video feed 104, such as spectrum spanning from 10.70 GHz-12.75 GHz across two signal polarizations, thereby yielding a bandwidth of about 4000 MHz. When the LNB 112 includes the OLNB, the four sub-bands are stacked in frequency such that the whole frequency range of the satellite video feed 104 can be transmitted in vertical polarization (e.g., 0.95 GHz-3.0 GHz) and in horizontal polarization (e.g., 3.4 GHz-5.45 GHz).

In some embodiments, the LNB 112 that uses an OLNB can have a semiconductor laser that takes the down-converted satellite video feed 104 and uses a modulated optical signal to send the entire spectrum of the satellite video feed 104 across a coupling path 114 (e.g., a fiber optic cable), where the satellite video feed 104 can be received by the VANAP 116. This is in contrast to conventional LNB's that may only be able to down-convert a portion of the satellite video feed 104, and conventional LNB's may not be able to carry the Ku-band corresponding to the satellite video feed 104 on a single coaxial cable, but rather only one of four sub-bands may be carried along a coaxial cable, such as using vertical and horizontal polarization, and in high and low frequency arrangements. In some embodiments, the coupling path 114 can include a plurality of coupling paths (e.g., one or more coaxial cables and/or fiber optic cables) so as to allow at least some, and/or all, of an entire spectrum of frequencies of the satellite video feed 104 to be transferred to the VANAP 116. In some embodiments, the satellite dish receiver 110 can be configured to communicatively couple directly to the VANAP 116 through connection to the LNB 112 that, in some embodiments, may be configured as an OLNB. The coupling path 114 can provide an electrical link and/or communicative link between the satellite dish receiver 110 and the VANAP 116. In some embodiments, the satellite dish receiver 110 and the LNB 112 are electrically powered solely by electrical coupling with the VANAP 116, such as via a coaxial cable and/or a power supply cable (e.g., a 12-volt cable). The coupling path 114 can include a communicative link, such as but not limited to, one or more coaxial cable and/or one or more fiber optic cable to provide communicatively coupling. In some embodiments, a coaxial cable can provide the communicative and electrical coupling.

In some embodiments, the VANAP 116 can include a processor 118, a microcell transceiver 120, a multiswitch 122, and a memory 124. The processor 118 can include one or more central processing units ("CPUs") configured with one or more processing cores. Those skilled in the concepts and technologies disclosed herein will appreciate the implementation of the processor 118 can utilize various computation architectures or combinations thereof, and as such, the processor 118 should not be construed as being limited to any particular computation architecture or combination of computation architectures, including but not limited to an ARM architecture, available for license from ARM HOLDINGS of Cambridge, United Kingdom, and/or an x86 and/or CORE architecture, such an architecture available from INTEL CORPORATION of Mountain View, Calif., and others.

In some embodiments, the multiswitch 122 can allow for the satellite video feed 104 to be split into one or more frequency ranges. In some embodiments, the multiswitch 122 can be configured as a virtual multiswitch that can receive the satellite video feed 104 through optical transmissions along the coupling path 114 from the LNB 112 that uses an OLNB. In some embodiments, the multiswitch 122 can communicatively couple to the microcell transceiver 120. The microcell transceiver 120 can include one or more radio transmitters and one or more radio receivers. In some embodiments, the microcell transceiver 120 can include at least one radio transmitter and at least one radio receiver that is configured to conform to an LTE protocol in a licensed spectrum and/or an unlicensed spectrum (e.g., LTE and LTE-U). When the microcell transceiver 120 includes a radio transmitter and/or receiver that conforms to LTE and/or LTE-U, the transmitter may be referred to as a Long Term Evolution radio transmitter. Examples of unlicensed spectrum can include the use of 5 GHz bands, millimeter wave bands (e.g., between 30 GHz and 300 GHz), or another band of frequencies that is not licensed. As used herein, use of the term "licensed" and/or "unlicensed" refers to a particular frequency band by which a regulatory agency (e.g., the Federal Communications Commission) has opined or not opined, respectively, as to the use of the frequencies in the band. It is understood that, as used in the claims, reference to the terms "licensed" and/or "unlicensed" are to be construed as corresponding to one or more particular frequency bands that devices of the present disclose can use, and therefore should not be construed as being directed to, or even pertaining to, abstract concepts or theories, but rather is rooted in science and technology.

The VANAP 116 also can have one or more instance of a memory 124. The memory 124 can include one or more hardware components that perform storage operations, including temporary or permanent storage operations. In some embodiments, the memory 124 can include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the processor 118. It is understood that, as used in the claims, the term "memory" does not include signals per se.

In some embodiments, the memory 124 can include one or more application programs, such as a control application 126, a VANAP identifier (ID) 128, and a geolocation ID 130. The control application 126 can include executable instructions, modules, programs, routines, or other commands configured to execute via the processor 118, to provide and/or cause various operations discussed herein. The control application 126 can be executed by the processor 118. In some embodiments, at least a portion of the control application 126 can include embedded firmware that operates in conjunction with hardware discussed herein. In some embodiments, the VANAP ID 128 can identify at least one of a model number, an equipment identifier, a software version number, a network identification, a combination thereof, or the like. In some embodiments, the VANAP ID 128 can be associated with the VANAP-enabled satellite dish system 106 so that the content provisioning system 144 can identify which VANAP is transmitting information in particular service areas. The geolocation ID 130 can indicate a physical and/or virtual geolocation in which a VANAP (e.g., the VANAP 116) is located in a physical environment and/or a network environment. For example, the geolocation ID 130 can indicate a latitude, a longitude, a street address, a city, a state, a network node location, a combination thereof, or the like. In some embodiments, the geolocation ID 130 can be assigned to the VANAP 116 upon installation at a particular geolocation. In some embodiments, the VANAP-enabled satellite dish system 106 can be mounted on a physical structure, such as a building, a house, a power transmission line, or another object that is elevated off the ground.

In some instances, the VANAP 116 and the satellite dish receiver 110 can reside within the same housing. In other embodiments, the VANAP 116 can use the coupling path 114 to communicatively and/or electrically link the satellite dish receiver 110 such that the VANAP 116 can be mounted or otherwise located proximate to the satellite dish receiver 110, such as on a structure next to the VANAP-enabled satellite dish system 106. As illustrated in FIG. 1, more than one instance of a VANAP-enabled satellite dish system 106 can serve multiple customer's premises that use VANR devices. For example, FIG. 1 illustrates the VANAP-enabled satellite dish system 106, the second VANAP-enabled satellite dish system 140, and the standalone VANAP 142. It is understood that the second VANAP-enabled satellite dish system 140 may be configured to be substantially similar to the VANAP-enabled satellite dish system 106. Additionally, the standalone VANAP 142 may be configured to be substantially similar to the VANAP 116 of the VANAP-enabled satellite dish system 106. It is understood that use of the term "second" is for illustration purposes only, and therefore should not be construed to denote a preference, an order, a hierarchy, a benefit, a detriment, an amount, or other characteristic, but rather is used for accounting purposes only. It is understood that in various embodiments, two or more VANAP-enabled satellite dishes may be included to facilitate transmissions from extraterrestrial sources (e.g., the satellite 102) and communications to and from VANRs (e.g., VANRs 160A-N). In some embodiments, one or more of the VANAP-enabled satellite dishes can be communicatively coupled to each other, such as the VANAP-enabled satellite dish system 106 communicatively coupled to the second VANAP-enabled satellite dish system 140 via the communication path 1. In some embodiments, the communication path 1 can be a wireless communication link that conforms to an LTE protocol in a licensed and/or unlicensed spectrum. In an embodiment, the standalone VANAP 142 can be a supplement to, and/or a replacement of, a VANAP residing within the second VANAP-enabled satellite dish system 140. In some embodiments, the standalone VANAP 142 can serve one or more VANAP-enabled satellite dish systems. In some embodiments, the standalone VANAP 142 can communicatively couple to a satellite dish receiver of the second VANAP-enabled satellite dish system 140 via the communication path 3. In some embodiments, the communication path 3 can include a fiber optic cable that can send at least a portion of the satellite video feed 104 from the second VANAP-enabled satellite dish system 140 to the standalone VANAP 142. In some embodiments, the standalone VANAP 142 can, in addition to transmitting the satellite video feed 104, send and receive data packets from a public and/or private network, such as from the optical network terminal 166 of the network 162 that communicatively couples the network 162 to the standalone VANAP 142 via the communication path 4. In some embodiments, the standalone VANAP 142 can provide one or more VANR devices access to the internet or another network connection, such as via the communication path 4. It is understood that the examples discussed above are for illustration purposes only, and therefore should not be construed as limiting in any way.

In some embodiments, multiple VANAPs can be synchronized and used to transmit the satellite video feed 104 to multiple VANR devices (e.g., the VANR devices 158A-N) across the same channel. The synchronized transmissions using the same channel can extend within a service area for each VANAP, such as a service area 138A corresponding with the VANAP-enabled satellite dish system 106, a service area 138B corresponding with the second VANAP-enabled satellite dish system 140, and a service area 138N corresponding with the standalone VANAP 142. Thus, the VANAPs can collectively form a multicast-broadcast single-frequency network (MBSFN) 138. To enable synchronization, in some embodiments, the VANAP 116 and/or a VANAP of the second VANAP-enabled satellite dish system 140 can create and send a time sync message 132 that can be sent to other VANAPs of the MBSFN 138. In some embodiments, the VANAP of the second VANAP-enabled satellite dish system 140 may send the time sync message 132 along the communication path 1 to the VANAP 116 and along the communication path 3 to the standalone VANAP 142. The time sync message 132 can include a time stamp that indicates the start time of a synchronization sequence so that multiple VANAPs (e.g., the VANAP 116, the VANAP of the second VANAP-enabled satellite dish system 140, and/or the standalone VANAP 142) can be synchronized and perform transmissions using a particular channel, such as a MBSFN channel 136. In some embodiments, the VANAP 116 can identify which MBSFN channel that should be used to engage in synchronized transmissions over the MBSFN channel 136 that is in an unlicensed spectrum. For example, in some embodiments, the VANAP 116 can execute the control application 126 and activate a radio transmitter of the microcell transceiver 120. The control application 126 can engage in a clear channel assessment (e.g., according to an LTE-Advanced standard) in order to determine which channel should be used for synchronized transmissions. In other embodiments, the time sync message 132 may have been sent to the VANAP 116. The control application 126 can inspect the time sync message 132 for an identification of the MBSFN channel (e.g., the MBSFN channel 136) that should be used to allow for synchronization within the MB SFN 138.

In some embodiments, the MBSFN 138 can collectively serve multiple customer premises using a lesser number of VANAP-enabled satellite dish systems and VANAPs than the number of customer premises. For example, as illustrated in FIG. 1, six customer premises (i.e., customer premises 156A-N) can be served with video content of the satellite video feed 104 by the VANAP-enabled satellite dish system 106, the second VANAP-enabled satellite dish system 140, and the standalone VANAP 142. Although illustrated as a house, it is understood that each customer premise can correspond with a location in which a VANR device is present and can receive transmissions within the MBSFN 138. As such, the physical shape and/or structure of the customer premises can vary. For example, in some embodiments, a customer premises can correspond with a large apartment building and/or a skyscraper. In some embodiments, a customer premises (e.g., any of the customer premises 156A-N) can include multiple devices that can consume video content from the satellite video feed 104, such as the VANR devices 158A-N.

In various embodiments, each VANR device (e.g., any of the VANR devices 158A-N) can include, and/or communicatively couple with, a video alternate network receiver (VANR) (e.g., one of the VANR 160A-160N). A VANR includes a radio transceiver that is capable of receiving transmissions from one or more of the VANAPs of a MBSFN in which the VANR resides, such as the VANAP 116, the VANAP of the second VANAP-enabled satellite dish system 140, and/or the standalone VANAP 142. Thus, the radio technology of the VANR will at least partially match that of the VANAP. For example, if the microcell transceiver 120 is configured to support LTE-U, then the VANR would need to also support LTE-U in order to receive transmissions of the satellite video feed 104 from the VANAP 116. However, embodiments of the present disclosure allow for VANRs to have fallback mechanisms such that if an LTE-U transmission is weak and/or non-existent (e.g., due to a power outage that stops the VANAP from sending LTE-U transmissions), each VANR can fall back to the next highest priority communication technology, such as Wi-Fi being transmitted by a local access point within the home of the customer premises. Yet, should the power to the local access point within the customer premises fail, the VANR can rely on another fallback mechanism that switches to LTE over licensed spectrum, such as receiving LTE transmissions from the access point 164. It is understood that the order in which the fallback mechanisms occur is for illustration purposes only, and therefore should not be construed as limiting in any way.

The system 100 can include a plurality of VANR devices, such as the VANR devices 158A-158N. As illustrated in FIG. 1 the VANR device 158A corresponds with a user equipment that, in this embodiment, takes the form of a mobile communication device. The VANR device 158A can include at least one VANR, such as the VANR 160A. The VANR 160A can be at least one of the radio receivers embedded within the VANR device 158A. In some embodiments, a VANR can include a plurality of radio receivers that can support carrier aggregation, spatial multiplexing, and/or other features associated with LTE-Advanced standard. As another example, the VANR device 158B can take the form of a tablet that communicatively couples to the VANR 160B. In some embodiments, the VANR 160B can take the form of a standalone access point for the VANR device 158B, where the VANR 160B is configured to receive the satellite video feed 104 and retransmit the transmission to the VANR device 158B. In some embodiments, the VANR device 158C can take the form of a television that can communicatively couple to the VANR 160C. In the illustrated embodiment, the VANR 160C can take the form of a smart dongle that can communicate over the MBSFN channel 136 that is in an unlicensed spectrum and receive the transmissions of the satellite video feed 104 from the VANAP 116. In some embodiments, the VANR 160C can be plugged into and/or wirelessly coupled to the VANR device 158C. As illustrated in FIG. 1, the VANR device 158N takes the form of a mobile communication device, and the VANR device 158N can include a VANR 160N embedded therein. It should be understood that the embodiments discussed above are illustrative, and should not be construed as being limiting in any way. Other embodiments of a VANR device can be configured to take the form of, but should not be limited to, a mobile communication device, a tablet, a wearable computing device, a heads-up display computer system, a vehicle computing system, an attachable computing device, a camera, an appliance (e.g., a refrigerator, an oven, a microwave, etc.), a television, a handheld device, or the like. It is understood that the examples discussed above are used for illustration purposes only, and therefore should not be construed to limit the scope of the disclosure in any way. It should be understood that each customer premises (e.g., the customer premises 156A-N) can include any number of VANR devices. It is understood that reference to the letter "N" denotes one or more than one instances of a corresponding element of the present disclosure. As such, the illustrated embodiment should not be construed as limiting in any way.

In some embodiments, the control application 126 may be able to identify the devices that are attempting to consume video convent, such as from the satellite video feed 104. For example, in some embodiments, the control application 126 may receive a VANR ID from a VANR device, such as a VANR ID 155 from the VANR device 158N. In some embodiments, the user 152 may be a customer of a satellite video service, and may live in a designated area. For example, the user 152 may reside in an area, such as the prohibited geolocation area 150, that corresponds with the geolocation ID 151. The user 152 may typically use their VANR device 158N to receive the satellite video feed 104 while the VANR device 158N is within the prohibited geolocation area 150. In an embodiment, the user 152 may desire to watch a football game that is being played within the user's hometown (i.e., within the prohibited geolocation area 150). However, because of contractual football regulations, the football associations may seek to have users attend the football game in person instead of watching the game at home on their VANR devices. As such, the football associations may prohibit the football game from being presented or otherwise shown on VANR devices corresponding to the geolocation ID 151 for the prohibited geolocation area 150. Sometimes, the geolocations in which video content is temporarily prohibited from being shown is called a "blackout region" or "blackout zone." However, the user 152 may not want to attend the game in person, but instead may still desire to watch the game from their VANR device.

Thus, in the embodiment shown in FIG. 1, the user 152 has taken their VANR device 158N outside of the prohibited geolocation area 150. In some embodiments, a VANR device may (a) periodically send a VANR ID to a VANAP, such as the VANR device 158N sending the VANR ID 155 to the VANAP-enabled satellite dish system 106. The control application 126 can analyze the VANR ID 155 to determine a current geolocation of the VANR device 158N. For example, because the VANR device 158N sent the VANR ID 155 to the VANAP 116, the control application 126 can determine that the VANR device 158N is within the service area 138A of the MBSFN 138. As such, the control application 126 can determine the geolocation ID 130 associated with the VANAP 116, and then determine whether the geolocation ID 130 matches the geolocation ID 151 associated with the VANR ID 155 of the VANR device 158N. In some embodiments, the geolocation ID 151 can be obtained from the VANR device 154, obtained from the content provisioning system 144 and/or through another network entity on the network 162. Because the geolocation ID 130 and the geolocation ID 151 do not match, the control application 126 can determine that the VANR device 158N does not originate from within the service area 138A. The control application 126 may be informed by the content provisioning system 144 that content specifically associated with the prohibited geolocation area 150 should not be shown to VANR devices from that region. Thus, the control application 126 may determine that the VANR device 158N originates from the prohibited geolocation area 150 that is prohibited from presenting a portion of video content from the satellite video feed 104. In some embodiments, the control application 126 can create a content lock message 134 that instructs the content provisioning system 144 to prevent the VANR device 158N from presenting the portion of video content from the satellite video feed 104 that is transmitted over the MBSFN channel 136. The content provisioning system 144 can receive the content lock message 134, and access a content authorization map 146 that indicates whether the VANR device 158N is allowed to view the portion of video content (e.g., the football game) from the satellite video feed 104. The content provisioning system 144 may confirm that the VANR device 158N is not permitted to view the portion of video content associated with the prohibited geolocation area 150 because the VANR device 158N is from the prohibited geolocation area 150. Therefore, the content provisioning system 144 can create a VANR lock message 148 that is sent to the VANR device 158N along the communication path 5, that prevents the VANR device 158N from presenting the portion of video content from the satellite video feed 104 on a display of the VANR device 158N. By this, the portion of video content can be geolocked so as to mitigate user abuses in attempting to access prohibited content.

It is also understood that zero, one, or more than one instance of the satellite 102, the satellite video feed 104, the VANAP-enabled satellite dish system 106, the satellite dish 108, the satellite dish receiver 110, the LNB 112, the coupling path 114, the VANAP 116, the processor 118, the microcell transceiver 120, the multiswitch 122, the memory 124 the control application 126, the VANAP ID 128, the geolocation ID 130, the time sync message 132, the content lock message 134, the MBSFN channel 136, the MBSFN 138, the second VANAP-enabled satellite dish system 140, the standalone VANAP 142, the content provisioning system 144, the customer premises 156A-N, the VANR devices 158A-N, the VANRs 160A-N, the network 162, the access point 164, the optical network terminal 166, and instances of elements included therein, can be included within the system 100. It is understood that the examples are for illustration purposes only and should not be construed as limiting in any way.

Figure 2:
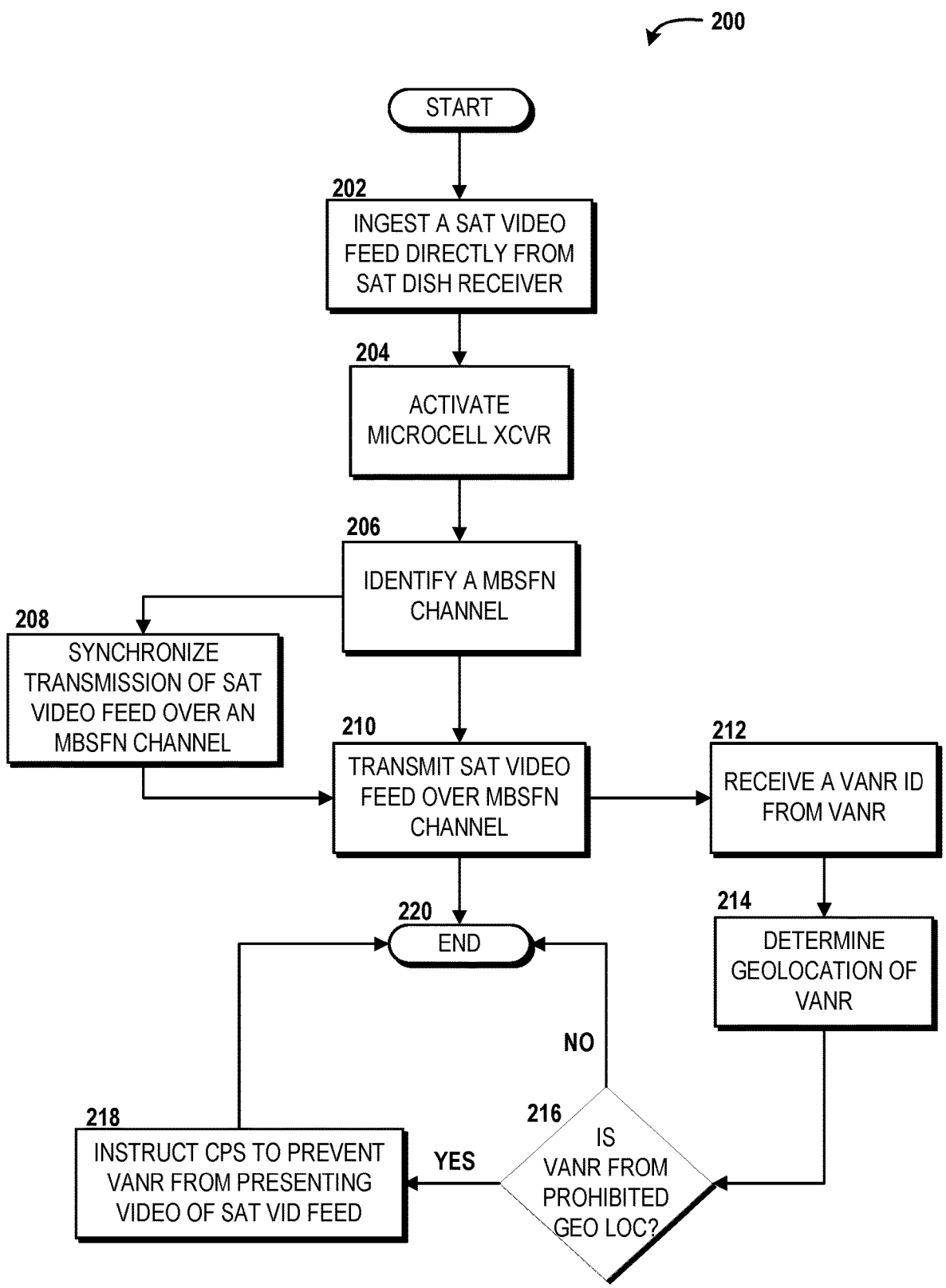
FIG. 2 is a flow diagram showing aspects of a method for enabling wireless delivery of video content to multiple customer premises, according to an illustrative embodiment of the concepts and technologies described herein.

Turning now to FIG. 2, aspects of a method 200 for video alternate network access points and receivers that enable wireless delivery of video content to multiple customer premises over a service area are provided herein, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, VANR devices, VANAPs, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the VANAP 116 and/or VANAP-enabled satellite dish system 106, to perform one or more operations and/or causing the processor to direct other components of the computing system or device to perform one or more of the operations.

For purposes of illustrating and describing the concepts of the present disclosure, the methods disclosed herein are described as being performed by the VANAP 116 via execution of one or more software modules such as, for example, the control application 126 that configure one or more processors. It should be understood that additional and/or alternative devices and/or network nodes can, in some embodiments, provide the functionality described herein via execution of one or more modules, applications, and/or other software including, but not limited to, the VANR device 158A executing the VANR 160A. Thus, the illustrated embodiments are illustrative, and should not be viewed as being limiting in any way.

The method 200 begins at operation 202. At operation 202, the VANAP 116 can ingest the satellite video feed 104 directly from the satellite dish receiver 110. In some embodiments, the satellite dish receiver 110 can communicatively couple directly to the VANAP 116 via at least one of an LNB 112, the LNB 112 configured with an OLNB converter, or a combination thereof. In some embodiments, the VANAP 116 can electrically power the satellite dish receiver 110. From operation 202, the method 200 can proceed to operation 204, where the control application 126 executing on the VANAP 116 can activate a microcell transceiver, such as the microcell transceiver 120 embedded, within the VANAP 116.

From operation 204, the method 200 can proceed to operation 206. At operation 206, the control application 126 can identify a multicast-broadcast single-frequency network (MBSFN) channel to use for providing the satellite video feed 104 to one or more VANR devices. For example, the control application 126 can determine that MBSFN channel 136 should be used to wirelessly provide video content from the satellite video feed 104 to the VANR devices 158A-158N. In some embodiments, the microcell transceiver 120 can include a Long Term Evolution radio transmitter that transmits the satellite video feed 104 over the MBSFN channel 136 in an unlicensed spectrum. The MBSFN channel 136 that is chosen for use can correspond with the unlicensed spectrum. In some embodiments, the VANAP 116 is one of a plurality of video alternate network access points that form a multicast-broadcast single-frequency network, such as the MBSFN 138. From operation 206, the method 200 can optionally proceed to operation 208. In some embodiments, the method 200 may proceed from operation 206 directly to operation 210. For clarity, a discussion of operation 208 will be provided first.

At operation 208, the VANAP 116 can synchronize the transmission of the satellite video feed 104 over the MBSFN channel 136 with at least one of the plurality of video alternate network access points within the MBSFN 138, such as the VANAP of the second VANAP-enabled satellite dish system 140 and the standalone VANAP 142. In some embodiments, the synchronization can occur by the sending and/or receiving of the time sync message 132 that allows for uniform transmission of video content of the satellite video feed 104.

From operation 208, the method 200 can proceed to operation 210. At operation 210, the VANAP 116 can use the microcell transceiver 120 (e.g., via the use of a radio transmitter that conforms to LTE-U) to transmit the satellite video feed 104 over at least the MBSFN channel 136 to multiple VANR devices 158A-158N. In some embodiments, the method 200 can proceed to operation 220, where the method 200 can end. In other embodiments, the method 200 can continue from operation 210 to operation 212.

At operation 212, the control application 126 can receive a VANR ID, such as the 155, from a roaming VANR device, such as the VANR device 158N. It is understood that use of the term "roaming" is for illustration purposes only, and therefore should not be construed as limiting in any way. In some embodiments, the VANR ID 155 can be sent to the VANAP 116 using an LTE-U channel, such as the MBSFN channel 136. From operation 212, the method 200 can proceed to operation 214, where, the control application 126 can determine a current geolocation of the roaming VANR device (e.g., the VANR device 158N), such as by obtaining the geolocation ID 130 from the memory 124 of the VANAP 116 and using the geolocation ID 130 as the current geolocation of the roaming VANR device (here the VANR device 158N). The current geolocation of the roaming VANR device (here the VANR device 158N) may not necessarily need to be precise, but rather may correspond to the general service area 138A provided by the VANAP 116, and thus associates with the geolocation ID 130.

From operation 214, the method 200 can proceed to operation 216, where the control application 126 can determine whether the roaming VANR device (here the VANR device 158N) originates from a prohibited geolocation. For example, the control application 126 can determine whether the VANR device 158N originates from the prohibited geolocation area 150. If the roaming VANR device (here the VANR device 158N) does not originate from the prohibited geolocation, then the method 200 can proceed along the NO path to operation 220, where the method 200 can end. In another embodiment, the control application 126 of the VANAP 116 determines that the roaming VANR device (here the VANR device 158N) originates from the prohibited geolocation area 150 that is prohibited from presenting a portion of video content from the satellite video feed 104. Therefore, because the VANR device 158N originates from the prohibited geolocation area 150, the method 200 continues along the YES path to operation 218.

At operation 218, the VANAP 116 can instruct the content provisioning system 144 to prevent the roaming VANR device (here the VANR device 158N) from presenting the portion of video content from the satellite video feed 104 that is transmitted over the MBSFN channel 136. From operation 218, the method 200 can proceed to operation 220, where the method 200 ends.

It should be understood that this example is illustrative and therefore should not be construed as being limiting in any way.

Figure 3:
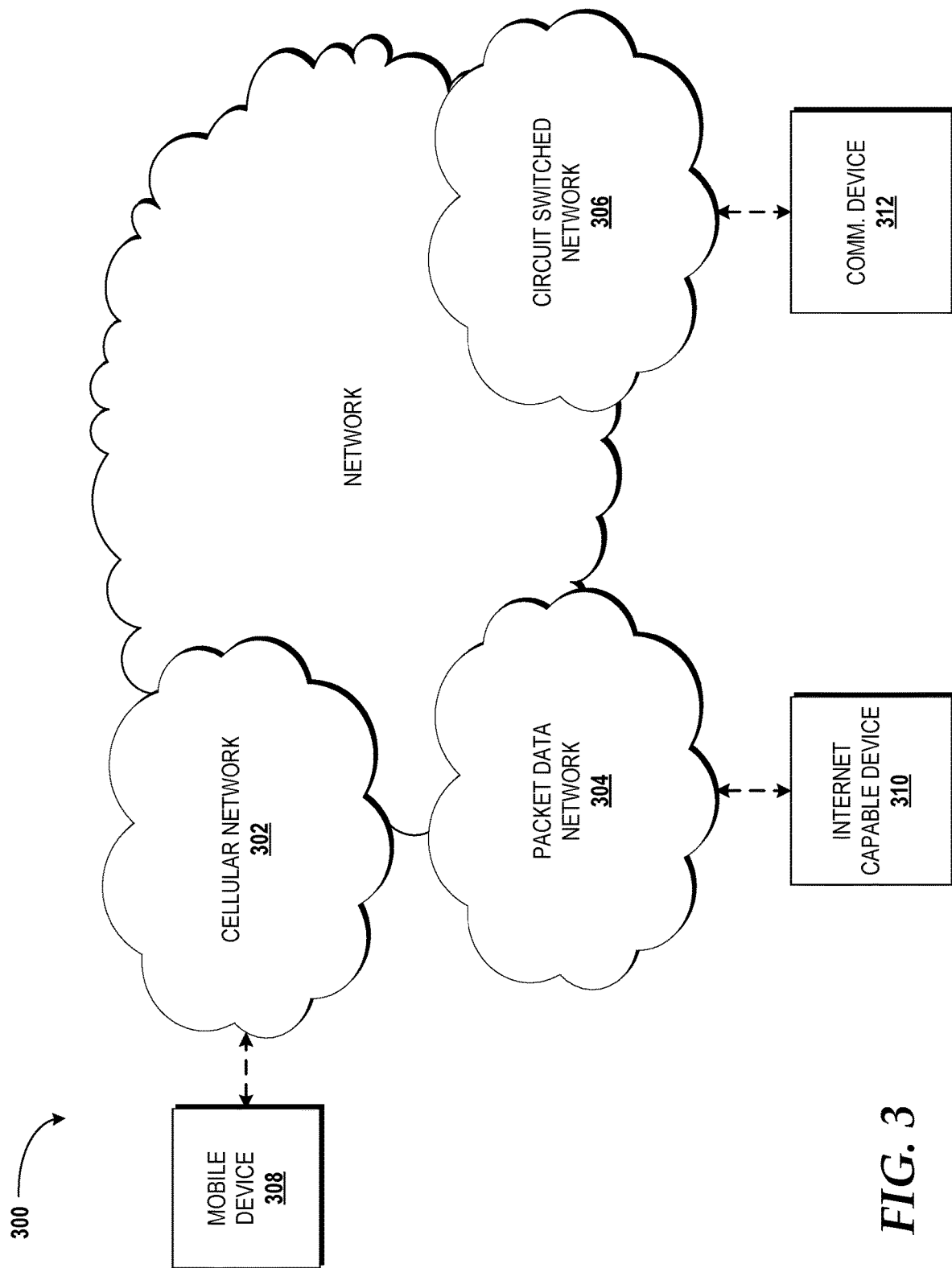
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 162 can be embodied as the network 300. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs or eNBs, base station controllers ("BSCs"), radio network controllers ("RNCs"), mobile switching centers ("MSCs"), MMES, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment, a mobile terminal, a PDA, a laptop computer, a handheld computer, and combinations thereof, can be operatively connected to the cellular network 302. In some embodiments, a VANR device (e.g., the VANR device 158A) can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-Advanced and LTE-U.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the network 162 can be configured as a packet data network, such as the packet data network 304. The circuit switched network 306 includes various hardware and software for providing circuit switched communications. The circuit switched network 306 may include, or may be, what is often referred to as a POTS. In some embodiments, the network 162 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a VANR device, a PC, a laptop, a portable device, a user equipment, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 162 can be performed by the cellular network 302, the packet data network 304, and/or the circuit switched network 306, alone or in combination with other networks, network elements, and the like, according at least to aspects of the features and operations discussed herein.

Figure 4:
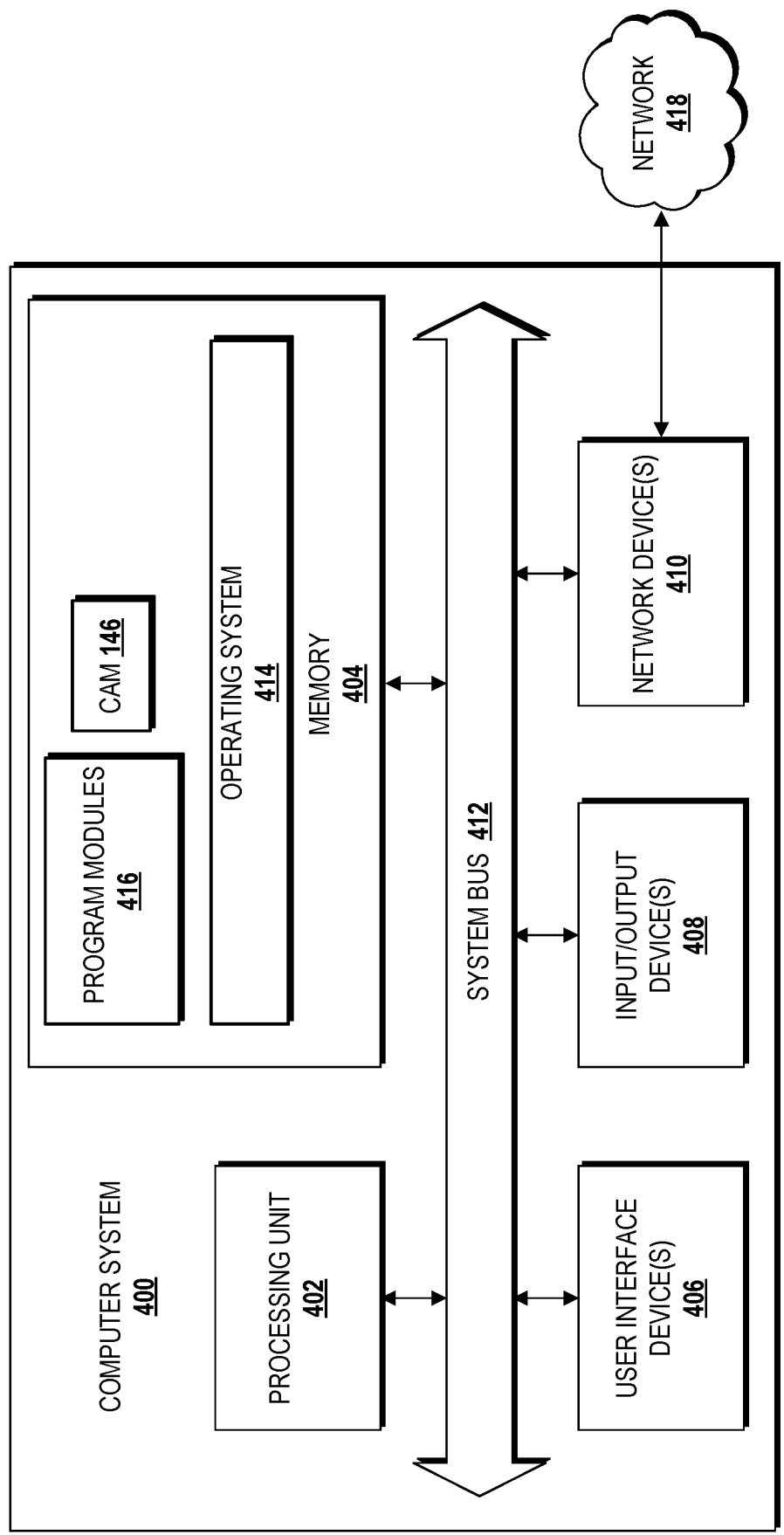
FIG. 4 is a block diagram illustrating an example computer system according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, at least a portion of one or more of the VANAP 116, the standalone VANAP 142, the access point 164, the content provisioning system 144, and/or the satellite 102 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include an analysis module, the control application 126, and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. Although not shown in FIG. 4, it should be understood that the memory 404 also can be configured to store the content authorization map 146 and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 162). Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, an MBSF network, or any other mobile network and/or wireline network.

Figure 5:
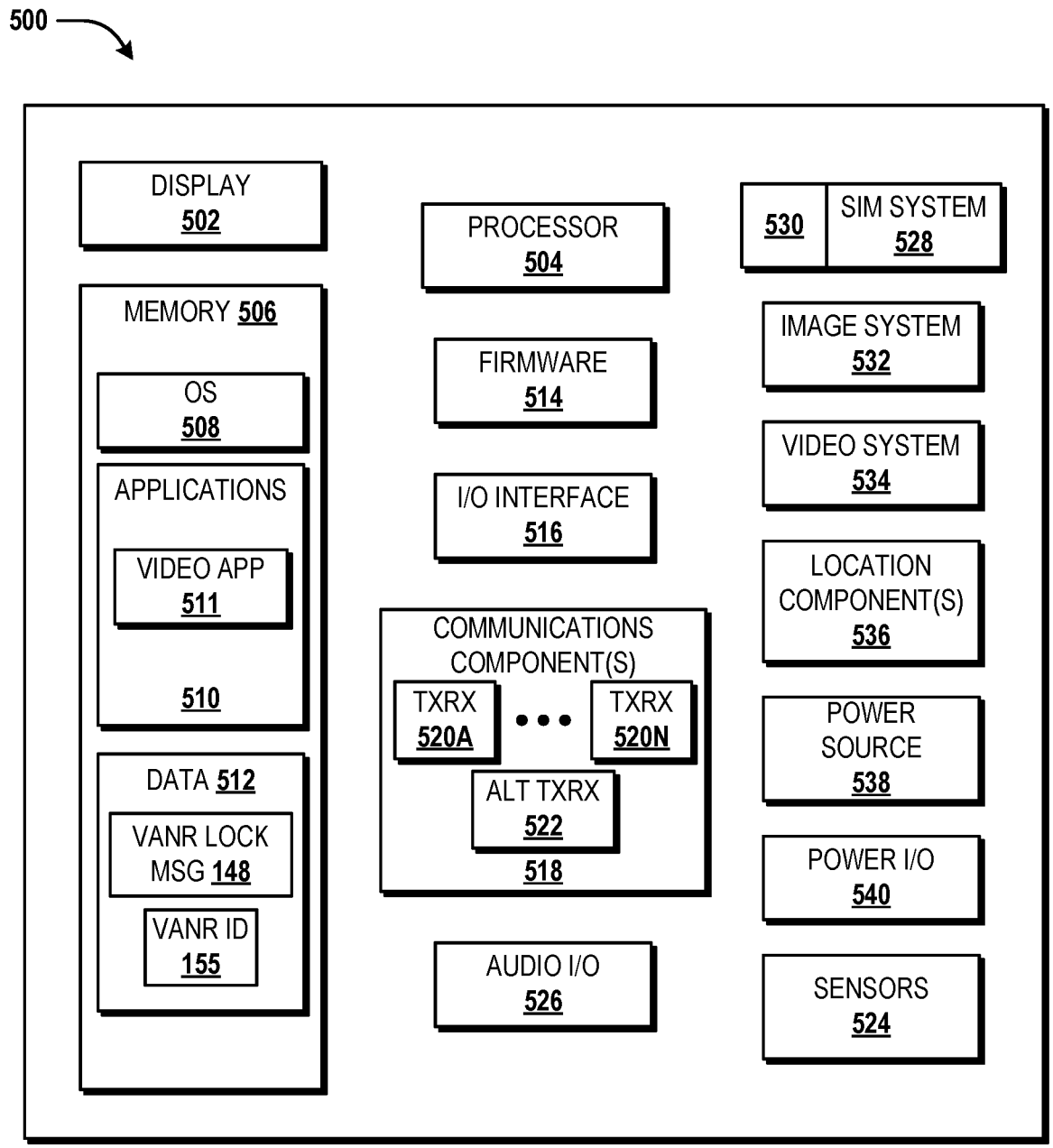
FIG. 5 is a block diagram illustrating an example mobile device capable of implementing aspects of a system according to embodiments of the concepts and technologies described herein.

Turning now to FIG. 5, an illustrative mobile device 500 and components thereof will be described. In some embodiments, one or more of the VANR device 158A-N (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing content of the satellite video feed 104, entering/deleting data, entering and setting local credentials (e.g., user IDs and passwords) for device access, configuring settings, manipulating address book content and/or settings, multimode interaction, interacting with other applications 510 (e.g., a satellite video playback application 511), and otherwise facilitating user interaction with the operating system 508, the applications 510, and/or other types or instances of data 512 that can be stored at the mobile device 500. The data 512 can include, for example, one or more identifiers, and/or other applications or program modules. In some embodiments, the data 512 can include one or more of the VANR lock message 148 and the VANR ID 155 or other data sent among and/or between the VANAP 116 and the VANR device 158A-N. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE") in licensed spectrum and unlicensed spectrum, and various other 2G, 2.5G, 3G, 4G, 5G and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Based on the foregoing, it should be appreciated that concepts and technologies directed to video alternate network access points and receivers have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A satellite dish system comprising:
a housing;
a satellite dish receiver residing within the housing, wherein the satellite dish receiver is configured to receive a satellite video feed; and
a video alternate network access point residing within the housing, wherein the video alternate network access point is directly connected to the satellite dish receiver via a coupling path that provides an electrical link and a communicative link between the satellite dish receiver and the video alternate network access point, the video alternate network access point comprising:
a processor; and
a memory that stores computer-executable instructions that, in response to execution by the processor, cause the processor to perform operations comprising:
ingesting the satellite video feed directly from the satellite dish receiver, wherein the satellite dish receiver is electrically powered solely by the video alternate network access point via the electrical link provided by the coupling path between the satellite dish receiver and the video alternate network access point,
activating a microcell transceiver embedded within the video alternate network access point of the satellite dish system,
identifying a multicast-broadcast single-frequency network channel, and
transmitting, from the microcell transceiver embedded within the video alternate network access point, the satellite video feed to a plurality of video alternate network receiver devices, wherein the satellite video feed is wirelessly transmitted by the video alternate network access point over at least the multicast-broadcast single-frequency network channel to the plurality of video alternate network receiver devices.

2. The satellite dish system of claim 1, wherein the microcell transceiver of the satellite dish system includes a long term evolution radio transmitter that transmits the satellite video feed over the multicast-broadcast single-frequency network channel in an unlicensed spectrum.

3. The satellite dish system of claim 2, wherein the video alternate network access point of the satellite dish system is one of a plurality of video alternate network access points from a plurality of satellite dish systems that form a multicast-broadcast single-frequency network.

4. The satellite dish system of claim 3, wherein the operations further comprise synchronizing transmission of the satellite video feed over the multicast-broadcast single-frequency network channel with at least one of the plurality of video alternate network access points within the multicast-broadcast single-frequency network.

5. The satellite dish system of claim 4, wherein the operations further comprise:
receiving, from a video alternate network receiver device of the plurality of video alternate network receiver devices, a video alternate network receiver identifier;
determining a current geolocation of the video alternate network receiver device, wherein the current geolocation is within a service area that provides the satellite video feed;
determining that the video alternate network receiver device is within the service area that provides the satellite video feed but that the video alternate network receiver device originates from a prohibited geolocation area that is prohibited from presenting a portion of video content from the satellite video feed; and
instructing a content provisioning system to prevent the video alternate network receiver device from presenting the portion of video content from the satellite video feed that is transmitted over the multicast-broadcast single-frequency network channel.

6. The satellite dish system of claim 1, wherein the satellite dish receiver comprises an optical low-noise block converter, and wherein the satellite dish receiver communicatively and electrically couples directly to the video alternate network access point via the optical low-noise block converter.

7. The satellite dish system of claim 6, wherein the optical low-noise block converter is electrically powered solely by the video alternate network access point via the electrical link provided by the coupling path.

8. A method comprising:
ingesting, by a video alternate network access point of a satellite dish system, a satellite video feed directly from a satellite dish receiver of the satellite dish system, wherein the satellite dish system comprises a housing and wherein the video alternate network access point and the satellite dish receiver reside within the housing, wherein the video alternate network access point is directly connected to the satellite dish receiver via a coupling path that provides an electrical link and a communicative link between the satellite dish receiver and the video alternate network access point, and wherein the satellite dish receiver is electrically powered solely by the video alternate network access point via the electrical link provided by the coupling path between the satellite dish receiver and the video alternate network access point;
activating, by the video alternate network access point, a microcell transceiver embedded within the video alternate network access point of the satellite dish system;
identifying, by the video alternate network access point, a multicast-broadcast single-frequency network channel; and
transmitting, from the microcell transceiver embedded within the video alternate network access point, the satellite video feed to a plurality of video alternate network receiver devices, wherein the satellite video feed is wirelessly transmitted by the video alternate network access point over at least the multicast-broadcast single-frequency network channel to the plurality of video alternate network receiver devices.

9. The method of claim 8, wherein the microcell transceiver of the satellite dish system includes a long term evolution radio transmitter that transmits the satellite video feed over the multicast-broadcast single-frequency network channel in an unlicensed spectrum.

10. The method of claim 9, wherein the video alternate network access point is one of a plurality of video alternate network access points from a plurality of satellite dish systems that form a multicast-broadcast single-frequency network.

11. The method of claim 10, further comprising synchronizing transmission of the satellite video feed over the multicast-broadcast single-frequency network channel with at least one of the plurality of video alternate network access points within the multicast-broadcast single-frequency network.

12. The method of claim 11, further comprising:
receiving, from a video alternate network receiver device of the plurality of video alternate network receiver devices, a video alternate network receiver identifier;
determining, by the video alternate network access point, a current geolocation of the video alternate network receiver device, wherein the current geolocation is within a service area that provides the satellite video feed;
determining, by the video alternate network access point, that the video alternate network receiver device is within the service area that provides the satellite video feed but that the video alternate network receiver device originates from a prohibited geolocation area that is prohibited from presenting a portion of video content from the satellite video feed; and
instructing, by the video alternate network access point, a content provisioning system to prevent the video alternate network receiver device from presenting the portion of video content from the satellite video feed that is transmitted over the multicast-broadcast single-frequency network channel.

13. The method of claim 8, wherein the satellite dish receiver comprises an optical low-noise block converter, and wherein the satellite dish receiver communicatively and electrically couples directly to the video alternate network access point via the optical low-noise block converter.

14. The method of claim 13, wherein the optical low-noise block converter is electrically powered solely by the video alternate network access point via the electrical link provided by the coupling path.

15. A computer storage medium having computer-executable instructions stored thereon that, in response to execution by a processor of a video alternate network access point of a satellite dish system, cause the processor to perform operations comprising:

ingesting a satellite video feed directly from a satellite dish receiver of the satellite dish system, wherein the satellite dish system comprises a housing and wherein the video alternate network access point and the satellite dish receiver reside within the housing, wherein the video alternate network access point is directly connected to the satellite dish receiver via a coupling path that provides an electrical link and a communicative link between the satellite dish receiver and the video alternate network access point, and wherein the satellite dish receiver is electrically powered solely by the video alternate network access point via the electrical link provided by the coupling path between the satellite dish receiver and the video alternate network access point;

activating a microcell transceiver embedded within the video alternate network access point of the satellite dish system;

identifying a multicast-broadcast single-frequency network channel; and transmitting, from the microcell transceiver embedded within the video alternate network access point, the satellite video feed to a plurality of video alternate network receiver devices, wherein the satellite video feed is wirelessly transmitted by the video alternate network access point over at least the multicast-broadcast single-frequency network channel to the plurality of video alternate network receiver devices.

16. The computer storage medium of claim 15, wherein the microcell transceiver of the satellite dish system includes a long term evolution radio transmitter that transmits the satellite video feed over the multicast-broadcast single-frequency network channel in an unlicensed spectrum.

17. The computer storage medium of claim 16, wherein the video alternate network access point is one of a plurality of video alternate network access points from a plurality of satellite dish systems that form a multicast-broadcast single-frequency network.

18. The computer storage medium of claim 17, wherein the operations further comprise synchronizing transmission of the satellite video feed over the multicast-broadcast single-frequency network channel with at least one of the plurality of video alternate network access points within the multicast-broadcast single-frequency network.

19. The computer storage medium of claim 18, wherein the operations further comprise:

receiving a video alternate network receiver identifier from a video alternate network receiver device of the plurality of video alternate network receiver devices;

determining a current geolocation of the video alternate network receiver device, wherein the current geolocation is within a service area that provides the satellite video feed;

determining that the video alternate network receiver device is within the service area that provides the satellite video feed but that the video alternate network receiver device originates from a prohibited geolocation area that is prohibited from presenting a portion of video content from the satellite video feed; and instructing a content provisioning system to prevent the video alternate network receiver device from presenting the portion of video content from the satellite video feed that is transmitted over the multicast-broadcast single-frequency network channel.

20. The computer storage medium of claim 16, wherein the satellite dish receiver comprises an optical low-noise block converter, and wherein the satellite dish receiver communicatively and electrically couples directly to the video alternate network access point via the optical low-noise block converter, and wherein the optical low-noise block converter is electrically powered solely by the video alternate network access point via the electrical link provided by the coupling path.

* * * * *